(12) United States Patent
Wu et al.

(10) Patent No.: US 11,666,892 B2
(45) Date of Patent: Jun. 6, 2023

(54) SUPPORTED TWO-COMPONENT METAL OXIDE CATALYST FOR ADVANCED TREATMENT OF PETROCHEMICAL WASTEWATER AND METHOD FOR PREPARING SAME

(71) Applicant: CHINESE RESEARCH ACADEMY OF ENVIRONMENT SCIENCES, Beijing (CN)

(72) Inventors: Changyong Wu, Beijing (CN); Yuexi Zhou, Beijing (CN); Liya Fu, Beijing (CN)

(73) Assignee: CHINESE RESEARCH ACADEMY OF ENVIRONMENT SCIENCES, Beijing (CN)

( * ) Notice: Subject to any disclaimer, the term of this patent is extended or adjusted under 35 U.S.C. 154(b) by 303 days.

(21) Appl. No.: 17/265,989

(22) PCT Filed: Sep. 7, 2020

(86) PCT No.: PCT/CN2020/113673
§ 371 (c)(1),
(2) Date: Feb. 4, 2021

(87) PCT Pub. No.: WO2021/196522
PCT Pub. Date: Oct. 7, 2021

(65) Prior Publication Data
US 2022/0111362 A1 Apr. 14, 2022

(30) Foreign Application Priority Data

Mar. 30, 2020 (CN) .......................... 202010238786.6

(51) Int. Cl.
*B01J 23/889* (2006.01)
*B01J 21/04* (2006.01)
*B01J 37/02* (2006.01)
*B01J 37/04* (2006.01)
*B01J 37/08* (2006.01)
*B01J 37/06* (2006.01)
*B01J 35/08* (2006.01)
*B01J 35/02* (2006.01)
*C02F 1/72* (2023.01)
*C02F 1/78* (2023.01)
*C02F 101/30* (2006.01)
*C02F 103/36* (2006.01)

(52) U.S. Cl.
CPC ........... *B01J 23/8892* (2013.01); *B01J 21/04* (2013.01); *B01J 35/023* (2013.01); *B01J 35/08* (2013.01); *B01J 37/0207* (2013.01); *B01J 37/0213* (2013.01); *B01J 37/04* (2013.01); *B01J 37/06* (2013.01); *B01J 37/08* (2013.01); *C02F 1/725* (2013.01); *C02F 1/78* (2013.01); *C02F 2101/30* (2013.01); *C02F 2103/365* (2013.01)

(58) Field of Classification Search
CPC ........ B01J 23/8892; B01J 23/72; B01J 21/04; B01J 35/023; B01J 37/0207
See application file for complete search history.

(56) References Cited

U.S. PATENT DOCUMENTS

2007/0298167 A1    12/2007    Ho et al.

FOREIGN PATENT DOCUMENTS

| CN | 102941084 A | * | 2/2013 |
| CN | 102941084 A |   | 2/2013 |
| CN | 104525206 A |   | 4/2015 |
| CN | 105344360 A |   | 2/2016 |
| CN | 108380214 A |   | 8/2018 |
| CN | 108745361 A |   | 11/2018 |
| CN | 109939695 A |   | 6/2019 |
| CN | 111282577 A |   | 6/2020 |

OTHER PUBLICATIONS

Fengxia Deng, et al,"Advanced treatment of refinery wastewater wastewater by heterogeneous catalytic ozonation oxidation", Journal of Zhejiang University(Engineering Science), vol. 49, No. 3, Mar. 31, 2015 (Mar. 31, 2015), ISSN: 1008-973X, pp. 556-557, section 1.4.

Aijun Xu, et al,"Preparation of Ni /ZrO2 catalysts for liquid hydrogenation of maleic anhydride by complex impregnation", Industrial Catalysis, vol. 26, No. 2, Feb. 28, 2018 (Feb. 28, 2018), ISSN: 1008-1143, p. 29, right-hand column, paragraph 2.

Xin Li, et al,"Preparation,Structural Characterization and Catalyst Activity of CuO—MnO2/Al2O3 Catalysts", Chemical Journal of Chinese Universities, vol. 28, No. 6, Jun. 30, 2007, ISSN: 0251-0790, p. 1155, section 1.2.

Wang, H.P. et al. "Enhanced catalytic toluene oxidation by interaction between copper oxide and manganese oxide in Cu—O—Mn/γ-Al2O3 catalysts", Applied Surface Science, vol. 420, May 19, 2017, ISSN: 0169-4332, p. 261, section 2.1.

(Continued)

*Primary Examiner* — Yong L Chu
(74) *Attorney, Agent, or Firm* — Bayramoglu Law Offices LLC

(57) ABSTRACT

A method for preparing a supported two-component metal oxide ozone catalytic oxidation catalyst for an advanced treatment of a petrochemical wastewater is provided. The supported two-component metal-oxide ozone catalytic oxidation catalyst is prepared from commercially-available active alumina balls by the steps of carrier activation, impregnating liquid preparation, carrier impregnation, catalyst roasting, and catalyst cleaning. The supported two-component metal oxide ozone catalytic oxidation catalyst has product stability, is reusable, and is of significance in application of ozone catalytic oxidation technologies as well as energy conservation and consumption reduction for petrochemical wastewater treatment plants.

18 Claims, 1 Drawing Sheet

(56) References Cited

OTHER PUBLICATIONS

Ying Zhang et al.,"Study on Copper/Manganese Oxide Adsorbents Sulfation Properties of Gamma-Al2O3 Carrier", Journal of Shanxi Coal-Mining Administrators College, vol. 27, No. 1, Feb. 28, 2014, ISSN: 2095-4298.

* cited by examiner

SUPPORTED TWO-COMPONENT METAL OXIDE CATALYST FOR ADVANCED TREATMENT OF PETROCHEMICAL WASTEWATER AND METHOD FOR PREPARING SAME

CROSS REFERENCE TO THE RELATED APPLICATIONS

This application is the national stage entry of International Application No. PCT/CN2020/113673, filed on Sep. 7, 2020, which is based upon and claims priority to Chinese Patent Application No. 202010238786.6, filed on Mar. 30, 2020, the entire contents of which are incorporated herein by reference.

TECHNICAL FIELD

The present invention belongs to the technical field of preparation of ozone catalysts, and in particular relates to a method for preparing a supported two-component ozone catalytic oxidation catalyst with $\gamma\text{-}Al_2O_3$ pellets as a carrier and copper oxide and manganese oxide as active components, with respect to the water quality of secondary biologically-treated effluent of petrochemical wastewater.

BACKGROUND

As a pillar industry for a country, the petroleum chemistry industry is also one of the heavy polluting industries. Wastewater emitted in its production process contains a large amount of toxic and refractory organic matters, which, if treated ineffectively, will cause serious pollution to a receiving water body, leading to severe damages to water ecological safety and drinking water and severe harms to human health. At present, the total amount of industrial wastewater emitted every year in China exceeds $2.1 \times 10^{10}$ tons, most of which are emitted after being treated by centralized comprehensive wastewater treatment plants. For large-scale petrochemical industrial parks, the advanced treatment from the comprehensive wastewater treatment plants acts as a last barrier to ensure the up-to-standard emission for the comprehensive petrochemical wastewater treatment. With the increase of water body protection requirements, the requirements of the emission standards for the petroleum chemistry industry in China have become more and more stringent. On Apr. 16, 2015, the former Ministry of Environmental Protection promulgated the Emission Standard of Pollutants for Petroleum Chemistry Industry (GB 31571-2015) (hereinafter referred to as the new standard). In addition to increasing the COD limit of direct emissions from petrochemical wastewater treatment plants to 60 mg/L or 50 mg/L, the new standard also adds emission concentration limits of 60 characteristic organic pollutants. Based on this, the effluent of many existing comprehensive petrochemical wastewater treatment plants in China can no longer meet the requirements of the new standard, and there is an urgent need for an advanced treatment process to improve the quality of effluents from wastewater plants.

There are many advanced treatment technologies for comprehensive petrochemical wastewater. Ozone has strong oxidizing properties and can oxidize almost all organic pollutants in water bodies. When dissolved in water, ozone oxidizes organic pollutants in two forms including a molecular reaction and a free radical reaction. The molecular reaction is to directly oxidize organic matters with ozone molecules. Such a reaction is selective, and in most cases, mainly attacks parts with high electron cloud density in chemical molecules to induce an electrophilic reaction. The free radical reaction is to indirectly oxidize organic matters by forming hydroxyl radicals (.OH, $E_0=2.80V$) from ozone. Such a reaction is generally fast and non-selective, and basically occurs to all organic matters. Moreover, ozone can spontaneously decompose in water in a short time without secondary pollution, but the disadvantages, such as high cost, low solubility in water, and incomplete oxidation of organic matters, of ozone restrict its application in the field of water treatment. At present, ozone oxidation during the advanced treatment of secondary effluent of petrochemical wastewater is extremely dependent on catalysts, and an ozone catalyst oxidizer must be used to improve the efficiency of ozone catalytic oxidation. At the present stage, newly-built wastewater treatment plants in the petrochemical industrial parks are lack of scientific and reasonable treatment processes, the catalyst is selected blindly, and the ozone depletion capacity is large. By catalyzing ozonolysis to produce hydroxyl radicals with higher oxidability, heterogeneous ozone catalytic oxidation may degrade organic pollutants that are difficult to ozonize alone in water, and then mineralize them thoroughly. The core of this technology is the preparation of an ozone catalytic oxidation catalyst.

The catalyst in the heterogeneous ozone catalytic oxidation is generally supported metal or metal oxide, activated carbon, etc. These catalysts typically have a large specific surface area. Alumina is typically selected as a carrier, on which metal or metal oxide is supported to prepare a heterogeneous ozone catalytic oxidation catalyst. Alumina has the following characteristics: (1) good strength and hardness; (2) moderate mass, so that alumina is in a semi-suspended state under the action of water flow; (3) large specific surface area, large porosity, and strong adsorption capacity; and (4) low price. Therefore, a carrier with $\gamma\text{-}Al_2O_3$ pellets as metal active components is selected. On the surface of alumina, ozone interacts with Lewis acid sites to produce .OH, and forms active sites in the presence of metals such as $CuO_x$ and $MnO_x$. $MnO_x$ can enhance the formation of .OH and the activity of .OH on the surface.

SUMMARY

The technical problem to be solved by the present invention is to address the problems of typical low efficiency of the ozone catalytic oxidation catalyst for advancement treatment with respect to more stringent emission standards faced by comprehensive petrochemical wastewater with large amount and containing low-concentration toxic and refractory organic matters, and to develop an ozone catalytic oxidizing agent suitable for its water quality for improving the removal rate for refractory organic matters in water, reducing the dosage of ozone, and saving operating cost.

The technical solution of the present invention is as follows:

Provided is a method for preparing a supported two-component metal-oxide ozone catalytic oxidation catalyst, comprising the following steps:

(a) carrier activation: with commercially-available active alumina balls as a carrier having a particle size of 2-5 mm, cleaning the active alumina balls with deionized water to neutrality, then activating the cleaned active alumina balls with a 0.1 mol/L hydrochloric acid solution for 2 h, then rinsing the activated active alumina balls to neutrality with deionized water again, and drying the rinsed active alumina balls at 105° C. for 12 h for later use;

(b) impregnating liquid preparation: preparing a mixed solution of a copper nitrate solution with a concentration of 0.10-0.16 mol/L and a manganese nitrate solution with a concentration of 0.02-0.04 mol/L, adding a certain amount of EDTA-2Na to the above mixed solution, and stirring for 2 h, so that the concentration of EDTA-2Na is 0.1 mol/L;

(c) carrier impregnation: impregnating the activated alumina carrier in the impregnating liquid at the impregnation temperature of 40° C. for 24 h, airing the carrier after impregnation, and drying for 12 h at 105° C., wherein 100 mL of the impregnating liquid is required per 100 g of alumina carrier;

(d) catalyst roasting: roasting the impregnated and dried catalyst in a muffle furnace at 350-400° C. for 2 h to obtain a roasted product; and (e) catalyst cleaning: washing the roasted product with deionized water and drying to obtain a supported bimetal oxide ozone catalytic oxidation catalyst.

The copper-manganese-supported ozone catalytic oxidation catalyst prepared according to the present invention is a light blue ball.

The $\gamma$-$Al_2O_3$ carrier used in the present invention is a white spherical particle and commercially-available, and preferably, is further characterized by a diameter of 2-5 mm.

As described in the present invention, $Mn(NO_3)_2$ can be a 50% $Mn(NO_3)_2$ solution (industrial grade), $Cu(NO_3)_2$ can be $Cu(NO_3)_3 \cdot 3H_2O$ (industrial grade), and EDTA-2Na (industrial grade) in the impregnating liquid has a concentration of 0.1 mol/L. Control indexes during production are as follows: the impregnating liquid is free of insoluble residues; the concentration of copper ions is no less than 0.16 mol/L; the concentration of manganese ions is no less than 0.04 mol/L; and the concentration error of EDTA-2Na is no more than ±10%.

In the above Step (b), the mixed solution is prepared by formulating a copper nitrate solution with a concentration of 0.10-0.16 mol/L and a manganese nitrate solution with a concentration of 0.02-0.04 mol/L, and mixing the copper nitrate solution and the manganese nitrate solution at 1:1.

EDTA in the impregnating liquid obtained in the above Step (b) has a concentration of 0.1 mol/L.

A molar ratio of copper ions to manganese ions in the impregnating liquid obtained in the above Step (b) is 4:1.

In the above preparation process, the roasting temperature in Step (d) is preferably 350-400° C., and the roasting time is preferably 2 h.

The present invention has the following beneficial effects:

(1) the copper/manganese two-component supported catalyst is used for ozone catalytic oxidation and degradation of the organic matters in the petrochemical wastewater, which, under the same conditions, has significantly faster organic matter degradation rate than ozone alone or unsupported $\gamma$-$Al_2O_3$ particles, and is greatly improved compared with the copper or manganese single-component supported catalyst; and the catalyst has high catalytic activity especially for refractory organic matters (especially hydrophilic components) in the secondary effluent of the petrochemical wastewater.

(2) With industrially produced $\gamma$-$Al_2O_3$ particles as the carrier, the catalyst can provide thermal stability, compressive strength, large specific surface and pore size, and good adsorbability, and hydroxyl groups on the surface may promote ozone decomposition to produce hydroxyl radicals, thereby providing sufficient active sites for active components. Raw materials are widely available, and the preparation process of the catalyst is simple and safe without complicated reaction process, and is low in production cost, and suitable for large-scale industrial production.

(3) The catalyst has good mechanical properties and stability, is reusable, and has a service life of more than 4 years.

The technical principle of the present invention is as follows: the organic matters in the secondary effluent of the petrochemical wastewater mainly exist in hydrophilic organic matters and hydrophobic acidic organic matters; the hydrophobic acidic organic matters can be directly oxidized by ozone, with a small part mineralized and removed and most parts converted into hydrophilic organic matters; and the hydrophilic organic matters must be removed in a catalytic oxidation process. The secondary effluent of the petrochemical wastewater contains anions with a concentration of more than 1000 mg/L, which easily leads to the quenching waste of hydroxyl radicals. The present invention can enable the hydrophilic organic matters to be adsorbed and enriched on the surface of the catalyst and then to undergo a redox reaction at active sites on the surface; after the reaction is completed, oxidation sites are exposed; and the organic matters are further adsorbed and oxidized at the active sites on the surface of the catalyst so as to be removed. The secondary effluent of the petrochemical wastewater contains a high concentration of anion quencher, which is almost unchanged in concentration on the surface of the prepared catalyst, without an enrichment effect. Repeatedly, local quenching protection occurs at metal active sites to enhance the oxidation process. An ozone catalytic oxidation unit has an effective protective effect, can reduce the dosage of ozone, effectively degrades the hydrophilic organic matters, which are difficult to oxidize by ozone alone, in the wastewater, shows more thorough oxidability and higher removal rate of the organic pollutants, and meanwhile can reduce the operating cost.

Beneficial effects: when the secondary effluent of the petrochemical wastewater is treated with the catalyst prepared according to the present invention, under the same conditions, the total organic carbon (TOC) removal rate is generally increased by more than 50% compared with the efficiency of the common commercially-available catalyst.

The method for preparing the supported two-component metal oxide ozone catalytic oxidation catalyst of the present invention will be further described below with reference to the accompanying drawings.

DETAILED DESCRIPTION OF THE EMBODIMENTS

Figure 1:
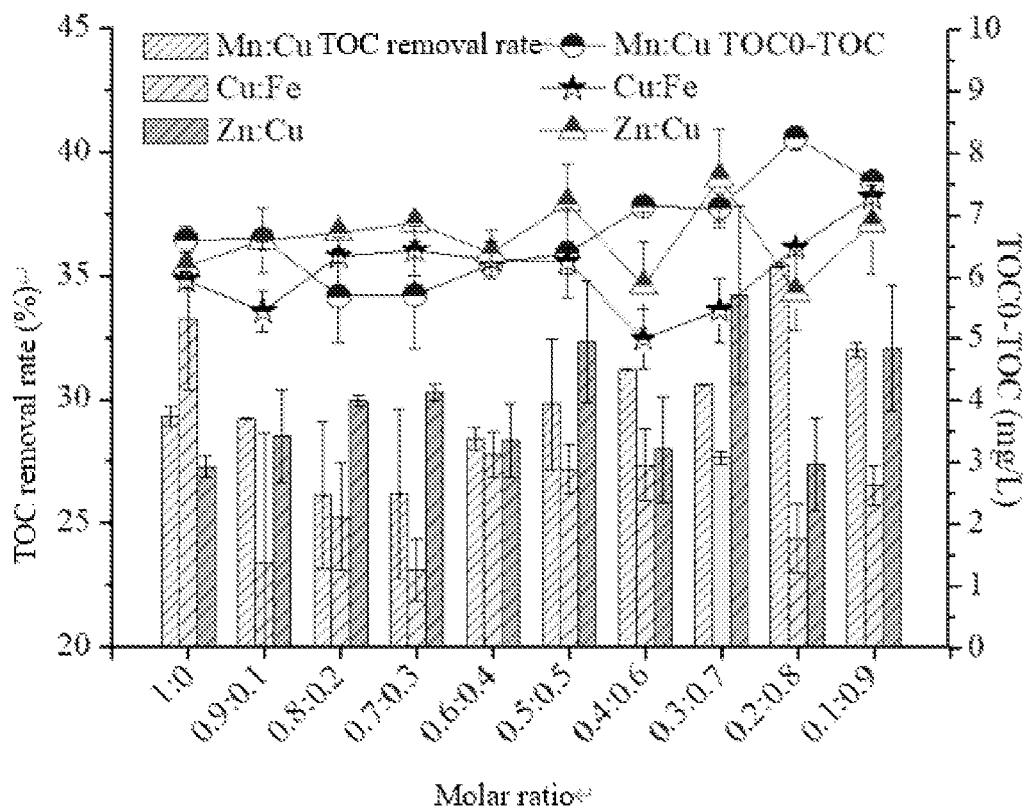
FIG. 1 shows influences of different molar ratios of active components on TOC removal rates of secondary petrochemical effluent via ozone catalytic oxidation.

In the present invention, different metal active components are selected to prepare the catalysts according to different molar ratios. Specifically, the method is as follows:

Step (1): with commercially-available active alumina balls as a carrier having a particle size of 3 mm, the active alumina balls were cleaned with deionized water to neutrality, then activated with a 0.1 mol/L hydrochloric acid solution for 2 h, then rinsed to neutrality with deionized water again, and dried at 105° C. for 12 h for later use.

Step (2): impregnating liquids were prepared with a combination of $Mn^{2+}$ ions and $Cu^{2+}$ ions, a combination of $Cu^{2+}$ ions and $Fe^{3+}$ ions, and a combination of $Zn^{2+}$ ions and $Cu^{2+}$ ions as active components of the catalyst respectively. In the above ion combinations, the sum of molar weights of the two ions in each of the combination of $Mn^{2+}$ ions and $Cu^{2+}$ ions, the combination of $Cu^{2+}$ ions and $Fe^{3+}$ ions, and the combination of $Zn^{2+}$ ions and $Cu^{2+}$ ions was 0.2 mol. $Mn(NO_3)_2$, $Cu(NO_3)_2$, $Fe(NO_3)_3$, and $Zn(NO_3)_2$ were weighed in corresponding weights according to the molar ratios of the corresponding compound ions being 1:0, 0.9: 0.1, 0.8:0.2, 0.7:0.3, 0.6:0.4, 0.5:0.5, 0.4:0.6, 0.3:0.7, 0.2: 0.8, 0.1:0.9 and 0:1. Salts weighed at the above ratios were added into corresponding containers, $Na_2EDTA$ was further added, and water was added till 1 L for dilution to obtain the impregnating liquids. The addition amount of $Na_2EDTA$ was 33.6 g.

Step (3): 1 kg of γ-$Al_2O_3$ carrier activated in Step (1) of the present invention was slowly added to the above prepared various ion impregnating liquids to be impregnated for 24 h, and then the impregnated particles were taken out, aired for 24 h, dried for 12 h at 105° C., and then roasted in a muffle furnace at 350-400° C. for 2 h to prepare different two-component supported catalysts.

The above various catalysts were used in an ozone-catalyzed degradation test of petrochemical wastewater. The above ozone-catalyzed degradation test was carried out in a glass reactor. The dosage of ozone was controlled by an ozone concentration detector and a flow meter, wherein the dosage of ozone was 0.5 mg/min and the dosage of the catalyst was 100 g/L. An effluent from a secondary sedimentation tank of a comprehensive wastewater plant in a petrochemical industrial part was taken as a treatment object. Samples were taken after 60 min of reaction to measure TOC values. The influences of molar ratios between the active components of the catalysts on TOC removal rate and removal amount of the catalysts against the secondary petrochemical effluent are shown in FIG. 1.

It can be seen from FIG. 1 that different multi-metal active components have different influences on TOC removal rate of wastewater via ozone catalytic oxidation under the condition of different molar ratios. When a molar ratio of Cu:Mn is 4:1, the TOC removal rate of wastewater via ozone catalytic oxidation is the highest, which is up to 35%. Therefore, this study finally determines that the active components of the catalyst are Cu and Mn in a molar ratio of 4:1.

Figure 2:
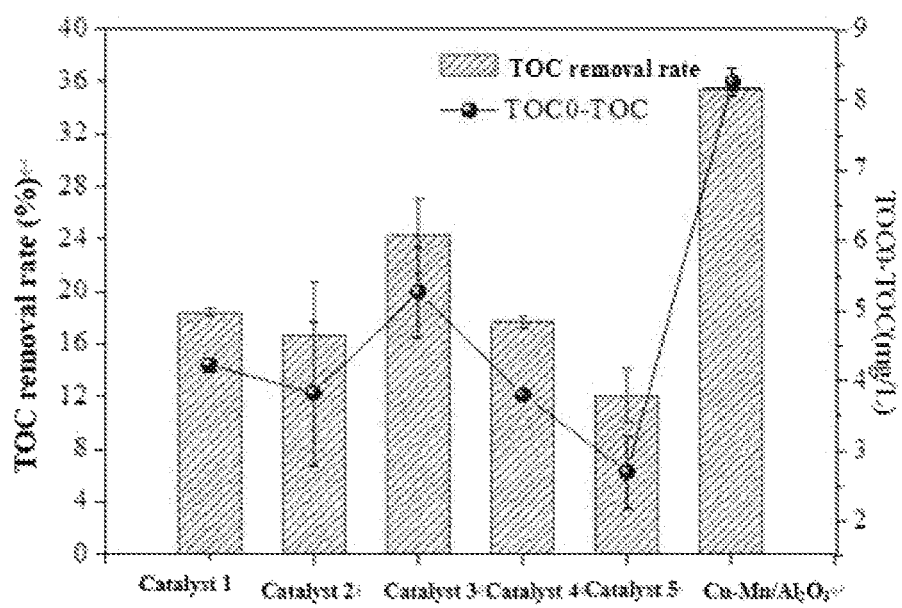
FIG. 2 shows comparison of TOC removal effects of the catalyst prepared according to the present invention and the general commercially-available ozone catalytic oxidizing agent for treatment of secondary petrochemical effluent on secondary petrochemical effluent.

Further, different commercially-available ozone catalytic oxidizing agents for the treatment of secondary petrochemical effluent were selected. The above catalysts were purchased from four provinces across China and named Shandong 1 #, Shandong 2 #, Jiangsu 1 #, Jiangxi 1 #, and Guangdong 1 #. Evaluation of catalyst performance with ozone-catalyzed degradation test: the test was carried out in a glass reactor, the dosage of ozone was controlled through an ozone concentration detector and a flow meter, and the loading level of the catalyst was 25 g/L; and an effluent from a secondary sedimentation tank of a comprehensive wastewater plant in a petrochemical industrial part was taken as a treatment object. The results are as shown in FIG. 2. Based on the results in FIG. 2, it is shown that the catalyst of the present invention is significantly superior than the general commercially-available catalysts used for secondary petrochemical effluent treatment.

The wastewater used in the present application was taken from the effluent of the second sedimentation tank, i.e., the secondary effluent of the petrochemical wastewater, of a wastewater treatment plant with a treatment scale of 2600 $m^3$/h in a petrochemical industrial park in China. The industrial influent of this comprehensive wastewater treatment plant was primarily treated industrial wastewater emitted from more than 70 sets of production facilities in oil refineries, pesticide plants, acrylonitrile plants, calcium carbide plants, fertilizer plants, synthetic resin plants and other plates subordinate to petrochemical companies, with a volume of about 2100 $m^3$/h. The secondary biological treatment process of this wastewater plant was hydrolysis acidification-AO. The secondary biochemically-treated effluent was complex, and each water quality index has a wide range of fluctuation, with a relative standard deviation of 0.4-25.1% (n=60). The properties of the effluent are shown in Table 1. As can be known from the table, the secondary effluent of the petrochemical wastewater is weakly alkaline, with an average COD concentration of about 80 mg/L, a $BOD_5$ concentration of 10 mg/L, a B/C value of less than 0.3, and extremely low biodegradability. Moreover, chloride ions and sulfate radicals are high in concentration, and are both quenchers for free radicals in the ozone oxidation system, which greatly limit the improvement of the catalytic oxidation effect of ozone.

The characteristic organic matters such as refractory organic matters in the biochemically-treated effluent of the petrochemical wastewater are complex, and their properties are shown in Table 2. As can be known from the table, the organic matters in the wastewater mainly include benzenes, alkanes, heterocycles, alcohols, esters, ketones, acids, nitriles, organic amines and other organic matters. Among them, three types of organic matters, including benzenes, hydrocarbons and heterocycles, are difficult to microbiologically degrade, contain 10-50 characteristic organic matters and have an average concentration which is at a high level of 100-600 μg/L. These organic matters in the biochemically-treated effluent of the petrochemical wastewater have stable chemical structures and are organic pollutants that are difficult to biodegrade.

TABLE 1

Partial conventional water quality indexes for secondary effluent of a petrochemical wastewater plant

| Parameter | Concentration | Unit | Parameter | Concentration | Unit |
| --- | --- | --- | --- | --- | --- |
| pH | 7.3 ± 0.4 | | TN | 9.3 ± 4.0 | mg/L |
| Chroma | 55 ± 5 | Degree | TP | 0.7 ± 0.5 | mg/L |
| SS | 27.6 ± 4.9 | mg/L | $NO_3^-$-N | 15.0 ± 2.8 | mg/L |
| $COD_{Cr}$ | 85.7 ± 25.5 | mg/L | DO | 5.0 ± 0.6 | mg/L |
| $BOD_5$ | 4.12 ± 1.98 | mg/L | $Cl^-$ | 379.5 ± 80.0 | mg/L |
| TOC | 23.5 ± 5.3 | mg/L | $PO_4^{2-}$ | 0.4 ± 0.2 | mg/L |
| $NH_4^+$-N | 3.5 ± 6.8 | mg/L | $SO_4^{2-}$ | 938 ± 28 | mg/L |

TABLE 2

Analysis results of types and concentrations of characteristic organic matters of biochemically-treated effluent of petrochemical wastewater

| Type of organic matter | Quantity (of types) | Average concentration (pg/L) |
| --- | --- | --- |
| Benzenes | 47 | 598.22 |
| Hydrocarbons | 10 | 123.33 |
| Heterocycles | 18 | 111.70 |
| Alcohols | 8 | 50.00 |
| Esters | 5 | 21.24 |

TABLE 2-continued

Analysis results of types and concentrations of characteristic organic matters of biochemically-treated effluent of petrochemical wastewater

| Type of organic matter | Quantity (of types) | Average concentration (pg/L) |
|---|---|---|
| Ketones | 7 | 44.89 |
| Acids | 2 | 3.34 |
| Nitriles | 3 | 23.38 |
| Organic amines | 9 | 59.44 |
| Miscellaneous | 7 | 297.24 |

The embodiments described above merely describe the preferred embodiments of the present invention, but are not intended to limit the scope of the present invention. Various variations and improvements made to the technical solutions of the present invention by those of ordinary skills in the art without departing from the design and spirit of the present invention shall fall within the protection scope defined by the claims of the present invention.

What is claimed is:

1. A method for preparing a supported two-component metal oxide ozone catalytic oxidation catalyst, comprising the following steps:
   (a) carrier activation: cleaning active alumina balls with deionized water to neutrality to obtain cleaned active alumina balls, then activating the cleaned active alumina balls with a hydrochloric acid solution to obtain activated active alumina balls, then rinsing the activated active alumina balls to neutrality with the deionized water again to obtain rinsed active alumina balls, and drying the rinsed active alumina balls to obtain an activated alumina carrier particle, wherein the active alumina balls have a particle size of 2-5 mm;
   (b) impregnating liquid preparation: preparing a mixed solution of copper nitrate and manganese nitrate in concentration, adding EDTA-2Na to the mixed solution to obtain a resulting solution, and evenly stirring the resulting solution to obtain an impregnating liquid;
   (c) carrier impregnation: impregnating the activated alumina carrier particle in the impregnating liquid, airing the activated alumina carrier particle after an impregnation, and then further heating and drying the activated alumina carrier particle to obtain an impregnated and dried catalyst;
   (d) catalyst roasting: roasting the impregnated and dried catalyst to obtain a roasted product; and
   (e) catalyst cleaning: washing the roasted product with the deionized water and drying to obtain the supported two-component metal oxide ozone catalytic oxidation catalyst.

2. The method according to claim 1, wherein the hydrochloric acid solution in step (a) has a concentration of 0.1 mol/L, and an activating time is 2 hours.

3. The method according to claim 1, wherein the activated alumina carrier particle in step (a) has a particle size of 2-5 mm.

4. The method for to claim 1, wherein in step (b), the mixed solution is prepared by formulating a copper nitrate solution with a concentration of 0.10-0.16 mol/L and a manganese nitrate solution with a concentration of 0.02-0.04 mol/L and mixing the copper nitrate solution and the manganese nitrate solution at 1:1.

5. The method according to claim 1, wherein the EDTA-2Na in the impregnating liquid obtained in step (b) has a concentration of 0.1 mol/L.

6. The method according to claim 1, wherein a molar ratio of copper ions to manganese ions in the impregnating liquid obtained in step (b) is 4:1.

7. The method according to claim 1, wherein in step (c), the activated alumina carrier particle is impregnated in the impregnating liquid for 24 hours at an impregnation temperature of 40° C.

8. The method according to claim 1, wherein in step (c), 100 mL of the impregnating liquid is required per 100 g of the activated alumina carrier particle.

9. The method according to claim 1, wherein in step (d), the impregnated and dried catalyst is roasted in a muffle furnace at 350-400° C. for 2 hours to obtain the roasted product.

10. A catalyst prepared by the method for preparing the supported two-component metal oxide ozone catalytic oxidation catalyst according to of claim 1.

11. The catalyst according to claim 10, wherein the hydrochloric acid solution in step (a) has a concentration of 0.1 mol/L, and an activating time is 2 hours.

12. The catalyst according to claim 10, wherein the activated alumina carrier particle in step (a) has a particle size of 2-5 mm.

13. The catalyst according to claim 10, wherein in step (b), the mixed solution is prepared by formulating a copper nitrate solution with a concentration of 0.10-0.16 mol/L and a manganese nitrate solution with a concentration of 0.02-0.04 mol/L and mixing the copper nitrate solution and the manganese nitrate solution at 1:1.

14. The catalyst according to claim 10, wherein the EDTA-2Na in the impregnating liquid obtained in step (b) has a concentration of 0.1 mol/L.

15. The catalyst according to claim 10, wherein a molar ratio of copper ions to manganese ions in the impregnating liquid obtained in step (b) is 4:1.

16. The catalyst according to claim 10, wherein in step (c), the activated alumina carrier particle is impregnated in the impregnating liquid for 24 hours at an impregnation temperature of 40° C.

17. The catalyst according to claim 10, wherein in step (c), 100 mL of the impregnating liquid is required per 100 g of the activated alumina carrier particle.

18. The catalyst according to claim 10, wherein in step (d), the impregnated and dried catalyst is roasted in a muffle furnace at 350-400° C. for 2 hours to obtain the roasted product.

* * * * *